United States Patent
Brittan et al.

(10) Patent No.: US 7,062,440 B2
(45) Date of Patent: Jun. 13, 2006

(54) MONITORING TEXT TO SPEECH OUTPUT TO EFFECT CONTROL OF BARGE-IN

(75) Inventors: Paul St John Brittan, Claverham (GB); Roger Cecil Ferry Tucker, Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 10/158,104

(22) Filed: May 31, 2002

(65) Prior Publication Data

US 2002/0184031 A1    Dec. 5, 2002

(30) Foreign Application Priority Data

Jun. 4, 2001    (GB)  ................................ 0113583.9

(51) Int. Cl.
G10L 13/06    (2006.01)

(52) U.S. Cl. ..................................... 704/266; 704/275

(58) Field of Classification Search ................ 704/266, 704/275; 379/208.01, 88.01–88.04
See application file for complete search history.

(56) References Cited

U.S. PATENT DOCUMENTS

| | | | | |
|---|---|---|---|---|
| 5,155,760 A * | 10/1992 | Johnson et al. | ........... | 379/88.01 |
| 5,765,130 A * | 6/1998 | Nguyen | ........... | 704/233 |
| 5,956,675 A * | 9/1999 | Setlur et al. | ........... | 704/231 |
| 6,173,266 B1 * | 1/2001 | Marx et al. | ........... | 704/270 |
| 6,240,390 B1 | 5/2001 | Jih | | |
| 6,246,986 B1 * | 6/2001 | Ammicht et al. | ........... | 704/270 |
| 6,334,103 B1 * | 12/2001 | Surace et al. | ........... | 704/257 |
| 6,418,216 B1 * | 7/2002 | Harrison et al. | ........... | 379/208.01 |
| 6,526,382 B1 * | 2/2003 | Yuschik | ........... | 704/275 |
| 6,574,595 B1 * | 6/2003 | Mitchell et al. | ........... | 704/242 |
| 6,574,601 B1 * | 6/2003 | Brown et al. | ........... | 704/270.1 |
| 6,606,598 B1 * | 8/2003 | Holthouse et al. | ........... | 704/275 |
| 6,728,679 B1 * | 4/2004 | Strubbe et al. | ........... | 704/270.1 |
| 6,868,385 B1 * | 3/2005 | Gerson | ........... | 704/275 |
| 6,882,973 B1 * | 4/2005 | Pickering | ........... | 704/270 |
| 6,934,756 B1 * | 8/2005 | Maes | ........... | 709/227 |

FOREIGN PATENT DOCUMENTS

| | | | |
|---|---|---|---|
| DE | 0598599 A1 * | 5/1994 | |
| EP | 0 589 599 A1 | 5/1994 | |

(Continued)

OTHER PUBLICATIONS

"Recognition Confidence Scoring for Use in Speech understanding Systems", TJ Hazen, T Buraniak, J Polifroni, and S Seneff, Proc. ISCA Tutorial and Research Workshop: ASR2000, Paris France, Sep. 2000.

(Continued)

*Primary Examiner*—Wayne Young
*Assistant Examiner*—Michael N. Opsasnick

(57) ABSTRACT

A speech system has a speech input channel including a speech recognizer, and a speech output channel including a text-to-speech converter. Associated with the input channel is a barge-in control for setting barge-in behavior parameters determining how the apparatus handles barge-in by a user during speech output by the apparatus. In order to make the barge-in control more responsive to the actual speech output from the output channel, a barge-in prediction arrangement is provided that is responsive to feature values produced during the operation of the text-to-speech converter to produce indications as to the most likely barge-in points. The barge-in control is responsive to these indications to adjust at least one of the barge-in behavior parameters for periods corresponding to the most likely barge-in points.

10 Claims, 5 Drawing Sheets

FOREIGN PATENT DOCUMENTS

WO  00/18100  3/2002

OTHER PUBLICATIONS

"A Step in the Direction of Synthesizing Natural-Sounding Speech" (Nick Campbell;Information Processing Society of Japan, Special Interest Group 97-Spoken Language Processing-15-1), no date.

"Overview of current text-to-speech techniques: Part I—text and linguistic analysis" M Edgington, A Lowry, P Jackson, AP Breen and S Minnis, BT Technical J vol. 14 No. 1 Jan. 1996.

"Overview of current text-to-speech techniques: Part II—prosody and speech generation", M Edgington, A Lowry, P Jackson, AP Breen and S Minnis, BT Technical J. vol. 14 No. 1 Jan. 1996.

"Introduction and Overview of W3C Speech Interface Framework", Jim A. Larson, W3C Working Draft Sep. 11, 2000.

"A Chinese Text-To-Speech System with Text Preprocessing and Confidence Measure for Practical Usage" Chih-Chung Kuo, 1997 IEEE TENCON, no date.

"Multilingual Text-To-Speech Synthesis, The Bell Labs Approach ", R Sproat, Editor ISBN 0-7923-8027-4 (pp. 1-6, 29-30 and 229-254), no date.

"An introduction to Text-To-Speech Synthesis", T Dutoit, ISBN 0-7923-4498-7 (pp. 13-14, 195-198 and 271-279, no date.

Natural-Sounding Speech Synthesis Using Variable-Length Units, Jon Rong-Wei Yi, S.B., Massachusetts Institue of Technology, 1997, no month.

* cited by examiner

MONITORING TEXT TO SPEECH OUTPUT TO EFFECT CONTROL OF BARGE-IN

FIELD OF THE INVENTION

The present application is based on, and claims priority to British Application Serial Number 0113583.9, filed Jun. 4, 2001, the disclosure of which is hereby incorporated by reference herein in its entirety.

The present invention relates to a speech system and method for determining how the system handles barge-in by a user during system speech output.

BACKGROUND OF THE INVENTION

FIG. 1 of the accompanying drawings shows an example prior-art speech system comprising an input channel 11 (including speech recognizer 5) for converting user speech into semantic input for dialog manager 7, and an output channel (including text-to-speech converter 6) for receiving semantic output from the dialog manager for conversion to speech. The dialog manager 7 is responsible for managing a dialog exchange with a user in accordance with a speech application script, here represented by tagged script pages 15. This example speech system is particularly suitable for use as a voice browser with the system being adapted to interpret mark-up tags, in pages 15, from, for example, four different voice markup languages, namely:

dialog markup language tags that specify voice dialog behaviour;

multimodal markup language tags that extends the dialog markup language to support other input modes (keyboard, mouse, etc.) and output modes (e.g. display);

speech grammar markup language tags that specify the grammar of user input; and speech synthesis markup language tags that specify voice characteristics, types of sentences, word emphasis, etc.

When a page 15 is loaded into the speech system, dialog manager 7 determines from the dialog tags and multimodal tags what actions are to be taken (the dialog manager being programmed to understand both the dialog and multimodal languages 19). These actions may include auxiliary functions 18 (available at any time during page processing) accessible through APIs and including such things as database lookups, user identity and validation, telephone call control etc. When speech output to the user is called for, the semantics of the output is passed, with any associated speech synthesis tags, to output channel 12 where a language generator 23 produces the final text to be rendered into speech by text-to-speech converter 6 and output (generally via a communications link) to speaker 17. In the simplest case, the text to be rendered into speech is fully specified in the voice page 15 and the language generator 23 is not required for generating the final output text; however, in more complex cases, only semantic elements are passed, embedded in tags of a natural language semantics markup language (not depicted in FIG. 1) that is understood by the language generator. The TTS converter 6 takes account of the speech synthesis tags when effecting text to speech conversion for which purpose it is cognisant of the speech synthesis markup language 25.

User speech input is received by microphone 16 and supplied (generally via a communications link) to an input channel of the speech system. Speech recognizer 5 generates text which is fed to a language understanding module 21 to produce semantics of the input for passing to the dialog manager 7. The speech recognizer 5 and language understanding module 21 work according to specific lexicon and grammar markup language 22 and, of course, take account of any grammar tags related to the current input that appear in page 15. The semantic output to the dialog manager 7 may simply be a permitted input word or may be more complex and include embedded tags of a natural language semantics markup language. The dialog manager 7 determines what action to take next (including, for example, fetching another page) based on the received user input and the dialog tags in the current page 15.

Any multimodal tags in the voice page 15 are used to control and interpret multimodal input/output. Such input/output is enabled by an appropriate recogniser 27 in the input channel 11 and an appropriate output constructor 28 in the output channel 12.

A barge-in control functional block 29 determines when user speech input is permitted over system speech output. Allowing barge-in requires careful management and must minimize the risk of extraneous noises being misinterpreted as user barge-in with a resultant inappropriate cessation of system output. A typical minimal barge-in arrangement in the case of telephony applications is to permit the user to interrupt only upon pressing a specific DTMF key, the control block 29 then recognizing the tone pattern and informing the dialog manager that it should stop talking and start listening. An alternative barge-in policy is to only recognize user speech input at certain points in a dialog, such as at the end of specific dialog sentences, not themselves marking the end of the system's "turn" in the dialog. This can be achieved by having the dialog manager notify the barge-in control block of the occurrence of such points in the system output, the block 29 then checking to see if the user starts to speak in the immediate following period. Rather than completely ignoring user speech during certain times, the barge-in control can be arranged to reduce the responsiveness of the input channel so that the risk of a barge-in being wrongly identified are minimized. If barge-in is permitted at any stage, it is preferable to require the recognizer to have 'recognized' a portion of user input before barge-in is determined to have occurred. However barge-in is identified, the dialog manager can be set to stop immediately, to continue to the end of the next phrase, or to continue to the end of the system's turn.

Whatever its precise form, the speech system can be located at any point between the user and the speech application script server. It will be appreciated that whilst the FIG. 1 system is useful in illustrating typical elements of a speech system, it represents only one possible arrangement of the multitude of possible arrangements for such systems.

Because a speech system is fundamentally trying to do what humans do very well, most improvements in speech systems have come about as a result of insights into how humans handle speech input and output. Humans have become very adapt at conveying information through the languages of speech and gesture. When listening to a conversation, humans are continuously building and refining mental models of the concepts being convey. These models are derived, not only from what is heard, but also, from how well the hearer thinks they have heard what was spoken. This distinction, between what and how well individuals have heard, is important. A measure of confidence in the ability to hear and distinguish between concepts, is critical to understanding and the construction of meaningful dialogue.

In automatic speech recognition, there are clues to the effectiveness of the recognition process. The closer competing recognition hypotheses are to one-another, the more likely there is confusion. Likewise, the further the test data is from the trained models, the more likely errors will arise. By extracting such observations during recognition, a separate classifier can be trained on correct hypotheses—such a system is described in the paper "Recognition Confidence Scoring for Use in Speech understanding Systems", T J Hazen, T Buraniak, J Polifroni, and S Seneff, Proc. ISCA Tutorial and Research Workshop: ASR2000, Paris, France, September 2000. FIG. 2 of the accompanying drawings depicts the system described in the paper and shows how, during the recognition of a test utterance, a speech recognizer 5 is arranged to generate a feature vector 31 that is passed to a separate classifier 32 where a confidence score (or a simply accept/reject decision) is generated. This score is then passed on to the natural language understanding component 21 of the system.

So far as speech generation is concerned, the ultimate test of a speech output system is its overall quality (particularly intelligibility and naturalness) to a human. As a result, the traditional approach to assessing speech synthesis has been to perform listening tests, where groups of subjects score synthesized utterances against a series of criteria.

Speech synthesis is usually carried out in two stages (see FIG. 3 of the accompanying drawings), namely:
  a natural language processing stage 35 where textual and linguistic analysis is performed to extract linguistic structure, from which sequences of phonemes and prosodic characteristics can be generated for each word in the text; and
  a speech generation stage 36 which generates the speech signal from the phoneme and prosodic sequences using either a formant or concatenative synthesis technique.

Concatenative synthesis works by joining together small units of digitized speech and it is important that their boundaries match closely. As part of the speech generation process the degree of mismatch is measured by a cost function—the higher the cumulative cost function for a piece of dialog, the worse the overall naturalness and intelligibility of the speech generated. This cost function is therefore an inherent measure of the quality of the concatenative speech generation. It has been proposed in the paper "A Step in the Direction of Synthesizing Natural-Sounding Speech" (Nick Campbell; Information Processing Society of Japan, Special Interest Group 97-Spoken Language Processing-15-1) to use the cost function to identify poorly rendered passages and add closing laughter to excuse it.

The present invention concerns barge-in control and it an object of the present invention to make the barge-in possibilities more adaptive to the current dialog.

SUMMARY OF THE INVENTION

According to one aspect of the present invention, there is provided speech apparatus comprising:
  a speech input channel including a speech recogniser;
  a speech output channel including a text-to-speech converter;
  a barge-in control for setting barge-in behaviour parameters determining how the apparatus handles barge-in by a user during speech output by the apparatus; and
  a barge-in prediction arrangement responsive to operation of the text-to-speech converter to produce indications as to the most likely barge-in points;

the barge-in control being responsive to the said indications to adjust at least one said barge-in behaviour parameter for periods corresponding to the most likely barge-in points.

According to another aspect of the present invention, there is provided a method of controlling barge-in in speech apparatus that has both a speech input channel including a speech recogniser and a speech output channel including a text-to-speech converter; the method comprising the steps of:
  (a) monitoring operation of the text-to-speech converter to produce indications as to the most likely barge-in points; and
  (b) adjusting, for periods corresponding to the most likely barge-in points as indicated by said indications, at least one barge-in behaviour parameter that determines how the apparatus handles barge-in by a user during speech output by the apparatus.

According to a further aspect of the present invention, there is provided a method of controlling barge-in in speech apparatus that has both a speech input channel and a speech output channel; the method comprising the steps of:
  (a) assessing the overall quality of the speech form output by the speech output channel to determine when the current speech form is inadequate; and
  (b) adjusting, for periods corresponding to when the speech form output by the speech output channel is determined to be inadequate, how the speech input channel handles barge-in by a user.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
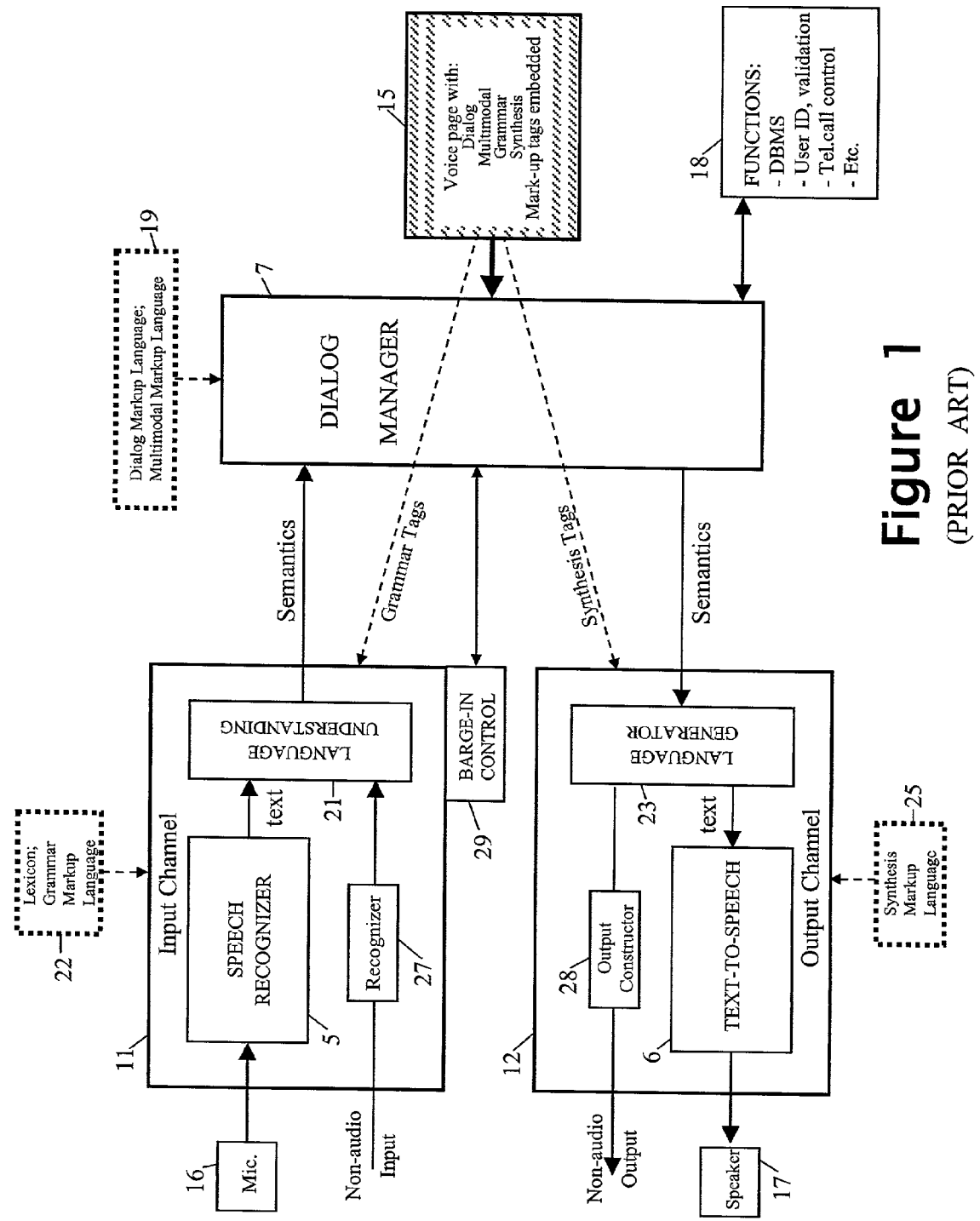
FIG. 1 is a functional block diagram of a known speech system.
Figure 2:
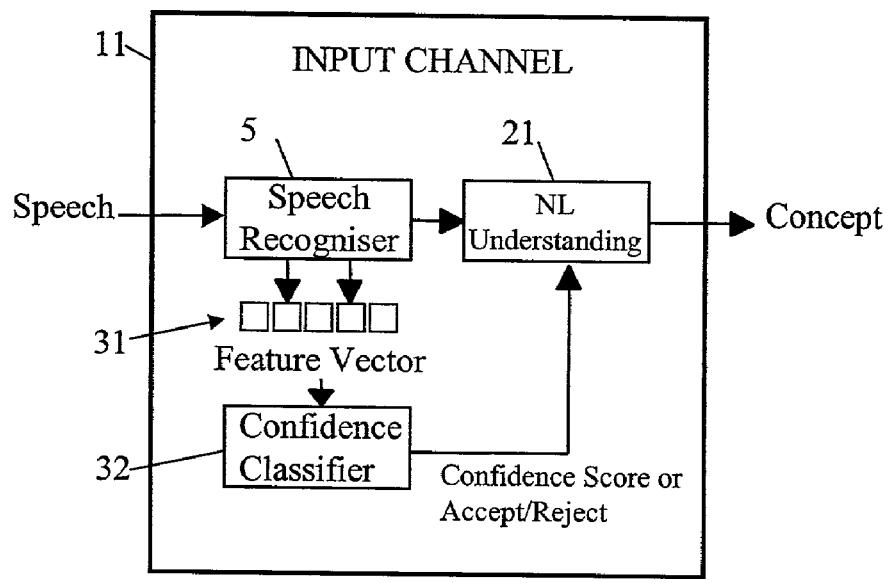
FIG. 2 is a diagram showing a known arrangement of a confidence classifier associated with a speech recognizer.
Figure 3:
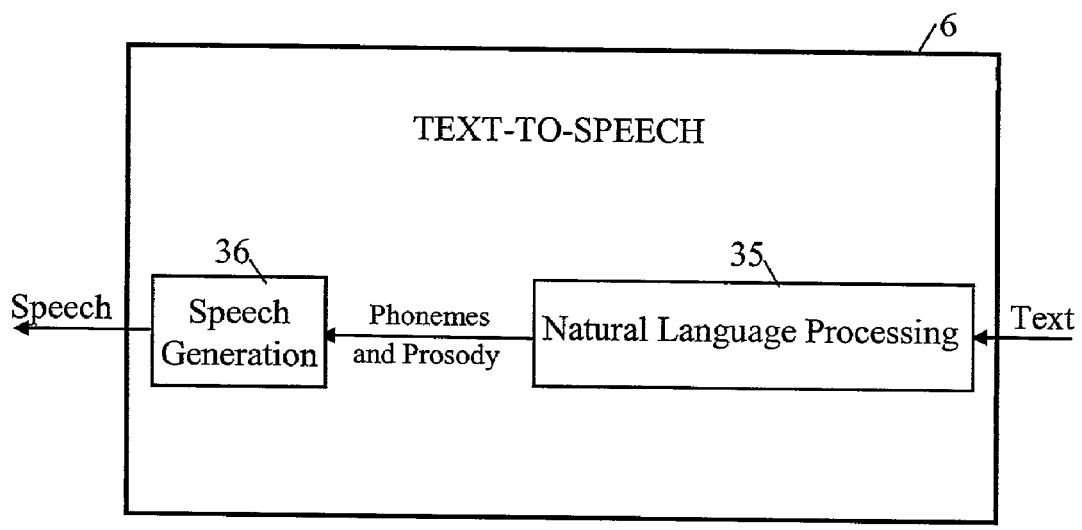
FIG. 3 is a diagram illustrating the main stages commonly involved in text-to-speech conversion.
Figure 4:
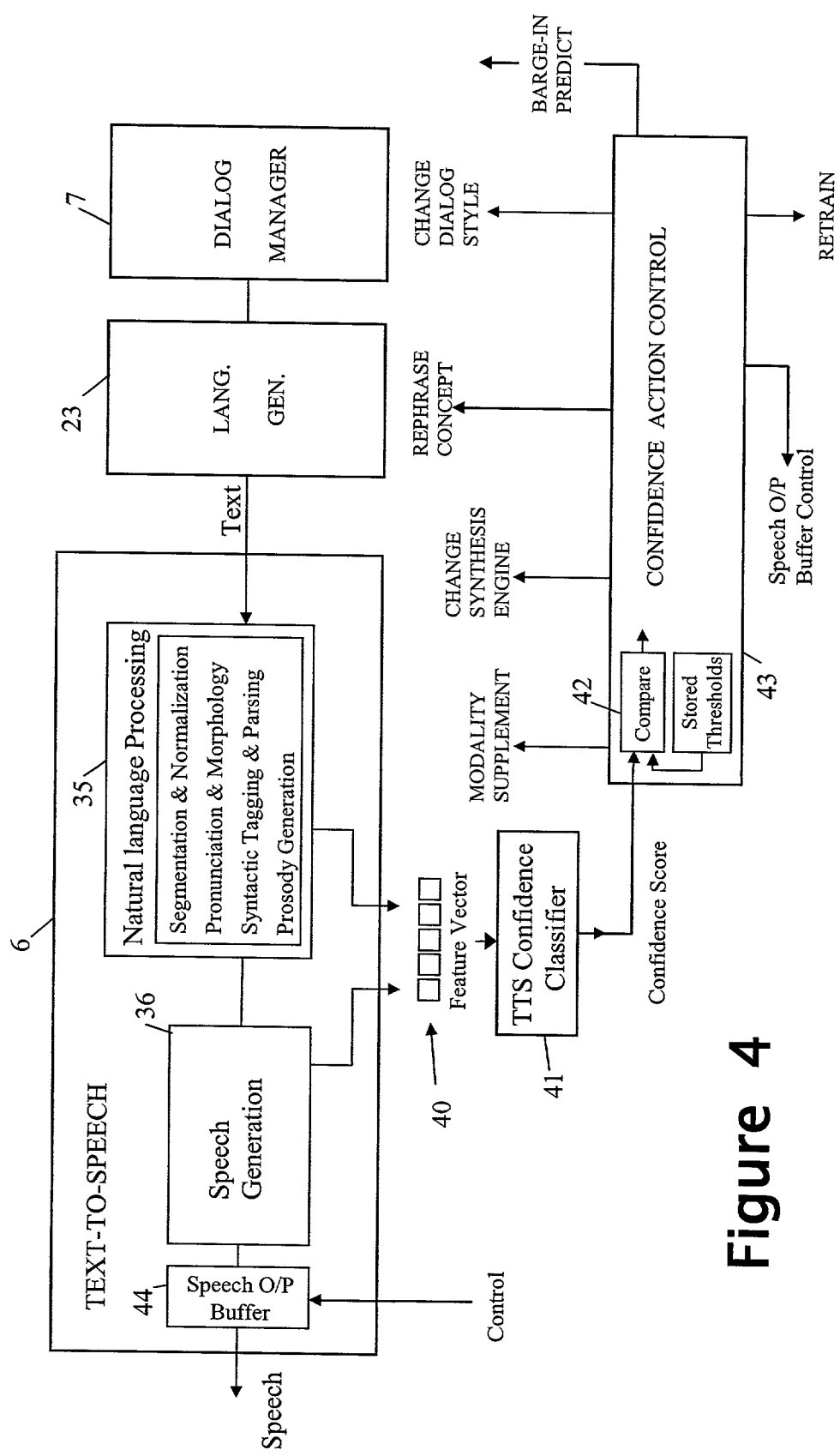
FIG. 4 is a diagram showing a confidence classifier associated with a text-to-speech converter

FIG. 4 shows the output path of a speech system, this output path comprising dialog manager 7, language generator 23, and text-to-speech converter (TTS) 6. The language generator 23 and TTS 6 together form a speech synthesis engine (for a system having only speech output, the synthesis engine constitutes the output channel 12 in the terminology used for FIG. 1). As already indicated with reference to FIG. 3, the TTS 6 generally comprises a natural language processing stage 35 and a speech generation stage 36.

With respect to the natural language processing stage 35, this typically comprises the following processes:
  Segmentation and normalization—the first process in synthesis usually involves abstracting the underlying text from the presentation style and segmenting the raw text. In parallel, any abbreviations, dates, or numbers are replaced with their corresponding full word groups. These groups are important when it comes to generating prosody, for example synthesizing credit card numbers.

Pronunciation and morphology—the next process involves generating pronunciations for each of the words in the text. This is either performed by a dictionary look-up process, or by the application of letter-to-sound rules. In languages such as English, where the pronunciation does not always follow spelling, dictionaries and morphological analysis are the only option for generating the correct pronunciation.

Syntactic tagging and parsing—the next process syntactically tags the individual words and phrases in the sentences to construct a syntactic representation.

Prosody generation—the final process in the natural language processing stage is to generate the perceived tempo, rhythm and emphasis for the words and sentences within the text. This involves inferring pitch contours, segment durations and changes in volume from the linguistic analysis of the previous stages.

As regards the speech generation stage 36, the generation of the final speech signal is generally performed in one of three ways: articulatory synthesis where the speech organs are modeled, waveform synthesis where the speech signals are modeled, and concatenative synthesis where pre-recorded segments of speech are extracted and joined from a speech corpus.

In practice, the composition of the processes involved in each of stages 35, 36 varies from synthesizer to synthesizer as will be apparent by reference to following synthesizer descriptions:

"Overview of current text-to-speech techniques: Part I—text and linguistic analysis" M Edgington, A Lowry, P Jackson, A P Breen and S Minnis, BT Technical J Vol 14 No 1 January 1996

"Overview of current text-to-speech techniques: Part II—prosody and speech generation", M Edgington, A Lowry, P Jackson, A P Breen and S Minnis, BT Technical J Vol 14 No 1 January 1996

"Multilingual Text-To-Speech Synthesis, The Bell Labs Approach", R Sproat, Editor ISBN 0-7923-8027-4

"An introduction to Text-To-Speech Synthesis", T Dutoit, ISBN 0-7923-4498-7

The overall quality (including aspects such as the intelligibility and/or naturalness) of the final synthesized speech is invariably linked to the ability of each stage to perform its own specific task. However, the stages are not mutually exclusive, and constraints, decision or errors introduced anywhere in the process will effect the final speech. The task is often compounded by a lack of information in the raw text string to describe the linguistic structure of message. This can introduce ambiguity in the segmentation stage, which in turn effects pronunciation and the generation of intonation.

At each stage in the synthesis process, clues are provided as to the quality of the final synthesized speech, e.g. the degree of syntactic ambiguity in the text, the number of alternative intonation contours, the amount of signal processing preformed in the speech generation process. By combining these clues (feature values) into a feature vector 40, a TTS confidence classifier 41 can be trained on the characteristics of good quality synthesized speech. Thereafter, during the synthesis of an unseen utterance, the classifier 41 is used to generate a confidence score in the synthesis process. This score can then be used for a variety of purposes including, for example, to cause the natural language generation block 23 or the dialogue manager 7 to modify the text to be synthesised. These and other uses of the confidence score will be more fully described below.

The selection of the features whose values are used for the vector 40 determines how well the classifier can distinguish between high and low confidence conditions. The features selected should reflect the constraints, decision, options and errors, introduced during the synthesis process, and should preferably also correlate to the qualities used to discern naturally sounding speech.

Natural Language Processing Features—Extracting the correct linguistic interpretation of the raw text is critical to generating naturally sounding speech. The natural language processing stages provide a number of useful features that can be included in the feature vector 40.

Number and closeness of alternative sentence and word level pronunciation hypotheses. Misunderstanding can developed from ambiguities in the resolution of abbreviations and alternative pronunciations of words. Statistical information is often available within stage 35 on the occurrence of alternative pronunciations.

Number and closeness of alternative segmentation and syntactic parses. The generation of prosody and intonation contours is dependent on good segmentation and parsing.

Speech Generation Features—Concatenative speech synthesis, in particular, provides a number of useful metrics for measuring the overall quality of the synthesized speech (see, for example, J Yi, "Natural-Sounding Speech Synthesis Using Variable-Length Units" MIT Master Thesis May 1998). Candidate features for the feature vector 40 include:

Accumulated unit selection cost for a synthesis hypothesis. As already noted, an important attribute of the unit selection cost is an indication of the cost associated with phoneme-to-phoneme transitions—a good indication of intelligibility.

The number and size of the units selected. By virtue of concatenating pre-sampled segments of speech, larger units capture more of the natural qualities of speech. Thus, the fewer units, the fewer number of joins and fewer joins means less signal processing, a process that introduces distortions in the speech.

Other candidate features will be apparent to persons skilled in the art and will depend on the form of the synthesizer involved. It is expected that a certain amount of experimentation will be required to determine the best mix of features for any particular synthesizer design. Since intelligibility of the speech output is generally more important than naturalness, the choice of features and/or their weighting with respect to the classifier output, is preferably such as to favor intelligibility over naturalness (that is, a very natural sounding speech output that is not very intelligible, will be given a lower confidence score than very intelligible output that is not very natural).

As regards the TTS confidence classifier itself, appropriate forms of classifier, such as a maximum a priori probability (MAP) classifier or an artificial neural networks, will be apparent to persons skilled in the art. The classifier 41 is trained against a series of utterances scored using a traditional scoring approach (such as described in the afore-referenced book "Introduction to text-to-speech Synthesis", T. Dutoit). For each utterance, the classifier is presented with the extracted confidence features and the listening scores. The type of classifier chosen must be able to model the correlation between the confidence features and the listening scores.

As already indicated, during operational use of the synthesizer, the confidence score output by classifier can be used to trigger action by many of the speech processing components to improve the perceived effectiveness of the complete system. A number of possible uses of the confidence score are considered below. In order to determine when the confidence score output from the classifier merits the taking of action and also potentially to decide between possible alternative actions, the present embodiment of the speech system is provided with a confidence action controller (CAC) 43 that receives the output of the classifier and compares it against one or more stored threshold values in comparator 42 in order to determine what action is to be taken. Since the action to be taken may be to generate a new output for the current utterance, the speech generator output just produced must be temporarily buffered in buffer 44 until the CAC 43 has determined whether a new output is to be generated; if a new output is not to be generated, then the CAC 43 signals to the buffer 44 to release the buffered output to form the output of the speech system.

Concept Rephrasing—the language generator 23 can be arranged to generate a new output for the current utterance in response to a trigger produced by the CAC 43 when the confidence score for the current output is determined to be too low. In particular, the language generator 23 can be arranged to:

choose one or more alternative words for the previously-determined phrasing of the current concept being interpreted by the speech synthesis subsystem 12; or insert pauses in front of certain words, such as non-dictionary words and other specialized terms and proper nouns (there being a natural human tendency to do this); or rephrase the current concept.

Changing words and/or inserting pauses may result in an improved confidence score, for example, as a result of a lower accumulated cost during concatenative speech generation. With regard to rephrasing, it may be noted that many concepts can be rephrased, using different linguistic constructions, while maintaining the same meaning, e.g. "There are three flights to London on Monday." could be rephrased as "On Monday, there are three flights to London". In this example, changing the position of the destination city and the departure date, dramatically change the intonation contours of the sentence. One sentence form may be more suited to the training data used, resulting in better synthesized speech.

The insertion of pauses can be undertaken by the TTS 6 rather than the language generator. In particular, the natural language processor 35 can effect pause insertion on the basis of indicators stored in its associated lexicon (words that are amenable to having a pause inserted in front of them whilst still sounding natural being suitably tagged). In this case, the CAC 43 could directly control the natural language processor 35 to effect pause insertion.

Dialogue Style Selection (FIG. 5)—Spoken dialogues span a wide range of styles from concise directed dialogues which constrain the use of language, to more open and free dialogues where either party in the conversation can take the initiative. Whilst the latter may be more pleasant to listen to, the former are more likely to be understood unambiguously. A simple example is an initial greeting of an enquiry system:

Standard Style: "Please tell me the nature of your enquiry and I will try to provide you with an answer"

Basic Style: "What do you want?"

Figure 5:
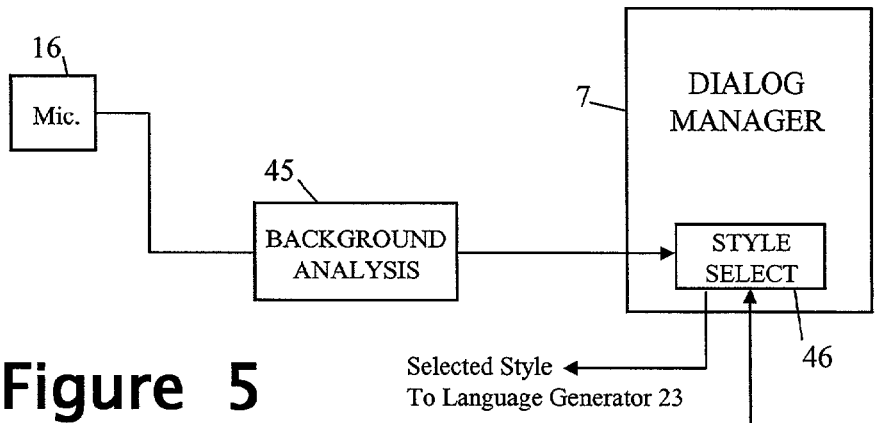
FIG. 5 is a diagram illustrating the use of the FIG. 4 confidence classifier to change dialog style.
Figure 5:
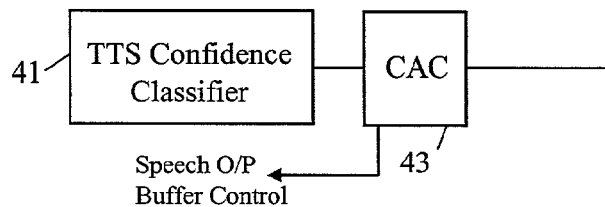

Since the choice of features for the feature vector 40 and the arrangement of the classifier 41 will generally be such that the confidence score favors understandability over naturalness, the confidence score can be used to trigger a change of dialog style. This is depicted in FIG. 5 where the CAC 43 is shown as connected to a style selection block 46 of dialog manager 7 in order to trigger the selection of a new style by block 46.

The CAC 43 can operate simply on the basis that if a low confidence score is produced, the dialog style should be changed to a more concise one to increase intelligibility; if only this policy is adopted, the dialog style will effectively ratchet towards the most concise, but least natural, style. Accordingly, it is preferred to operate a policy which balances intelligibility and naturalness whilst maintaining a minimum level of intelligibility; according to this policy, changes in confidence score in a sense indicating a reduced intelligibility of speech output lead to changes in dialog style in favor of intelligibility whilst changes in confidence score in a sense indicating improved intelligibility of speech output lead to changes in dialog style in favor of naturalness.

Changing dialog styles to match the style selected by selection block 46 can be effected in a number of different ways; for example, the dialog manager 7 may be supplied with alternative scripts, one for each style, in which case the selected style is used by the dialog manager to select the script to be used in instructing the language generator 23. Alternatively, language generator 23 can be arranged to derive the text for conversion according to the selected style (this is the arrangement depicted in FIG. 5). The style selection block 46 is operative to set an initial dialog style in dependence, for example, on user profile and speech application information.

In the present example, the style selection block 46 on being triggered by CAC 43 to change style, initially does so only for the purposes of trying an alternative style for the current utterance. If this changed style results in a better confidence score, then the style selection block can either be arranged to use the newly-selected style for subsequent utterances or to revert to the style previously in use, for future utterances (the CAC can be made responsible for informing the selection block 46 whether the change in style resulted in an improved confidence score or else the confidence scores from classifier 41 can be supplied to the block directly).

Changing dialog style can also be effected for other reasons concerning the intelligibility of the speech heard by the user. Thus, if the user is in a noisy environment (for example, in a vehicle) then the system can be arranged to narrow and direct the dialogue, reducing the chance of misunderstanding. On the other hand, if the environment is quiet, the dialogue could be opened up, allowing for mixed initiative. To this end, the speech system is provided with a background analysis block 45 connected to sound input source 16 in order to analyze the input sound to determine whether the background is a noisy one; the output from block 45 is fed to the style selection block 46 to indicate to the latter whether background is noisy or quiet. It will be appreciated that the output of block 45 can be more fine grain than just two states. The task of the background analysis block 45 can be facilitated by (i) having the TTS 6 inform it when the latter is outputting speech (this avoids feedback of the sound output being misinterpreted as noise), and (ii) having the speech recognizer 5 inform the block 45 when the input is recognizable user input and therefore not background noise (appropriate account being taken of the delay inherent in the recognizer determining input to be speech input).

Where both intelligibility as measured by the confidence score output by the classifier and the level background noise are used to effect the selected dialog style, it may be preferable to feed the confidence score directly to the style selection block 45 to enable it to use this score in combination with the background-noise measure to determine which style to set.

It is also possible to provide for user selection of dialog style.

Figure 6:
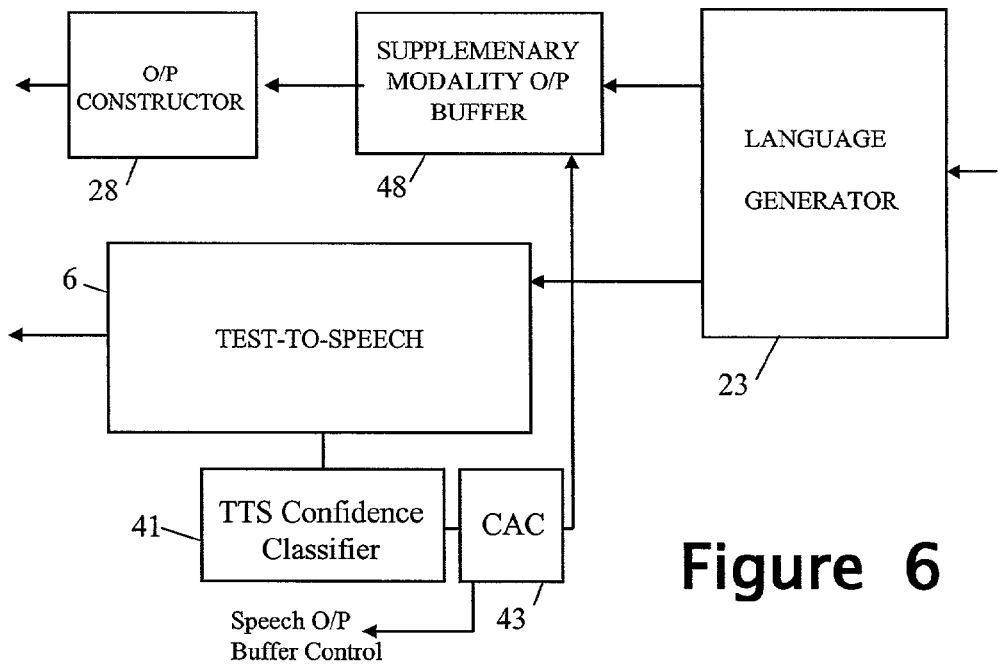
FIG. 6 is a diagram illustrating the use of the FIG. 4 confidence classifier to selectively control a supplementary-modality output.

Multi-modal output (FIG. 6)—more and more devices, such as third generation mobile appliances, are being provided with the means for conveying a concept using both voice and a graphical display. If confidence is low in the synthesized speech, then more emphasis can be placed on the visual display of the concept. For example, where a user is receiving travel directions with specific instructions being given by speech and a map being displayed, then if the classifier produces a low confidence score in relation to an utterance including a particular street name, that name can be displayed in large text on the display. In another scenario, the display is only used when clarification of the speech channel is required. In both cases, the display acts as a supplementary modality for clarifying or exemplifying the speech channel. FIG. 6 illustrates an implementation of such an arrangement in the case of a generalized supplementary modality (whilst a visual output is likely to be the best form of supplementary modality in most cases, other modalities are possible such as touch/feel-dependent modalities). In FIG. 6, the language generator 23 provides not only a text output to the TTS 6 but also a supplementary modality output that is held in buffer 48. This supplementary modality output is only used if the output of the classifier 41 indicates a low confidence in the current speech output; in this event, the CAC causes the supplementary modality output to be fed to the output constructor 28 where it is converted into a suitable form (for example, for display). In this embodiment, the speech output is always produced and, accordingly, the speech output buffer 44 is not required.

The fact that a supplementary modality output is present is preferably indicated to the user by the CAC 43 triggering a bleep or other sound indication, or a prompt in another modality (such as vibrations generated by a vibrator device).

The supplementary modality can, in fact, be used as an alternative modality—that is, it substitutes for the speech output for a particular utterance rather than supplementing it. In this case, the speech output buffer 44 is retained and the CAC 43 not only controls output from the supplementary-modality output buffer 48 but also controls output from buffer 44 (in anti-phase to output from buffer 48).

Figure 7:
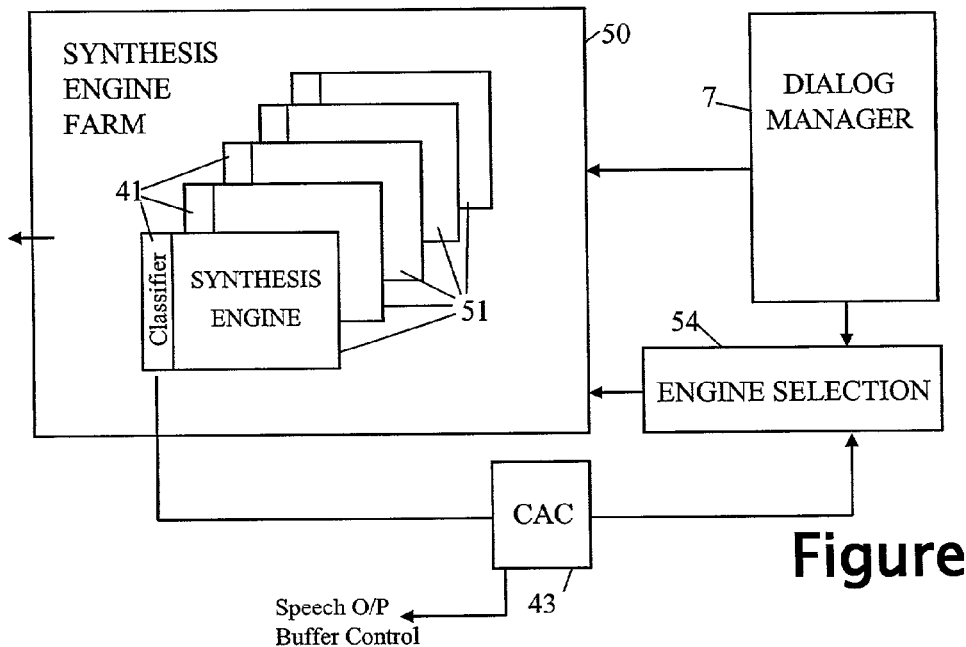
FIG. 7 is a diagram illustrating the use of the FIG. 4 confidence classifier to change the selected synthesis engine from amongst a farm of such engines.

Synthesis Engine Selection (FIG. 7)—it is well understood than the best performing synthesis engines are trained and tailored in specific domains. By providing a farm 50 of synthesis engines 51, the most appropriate synthesis engine can be chosen for a particular speech application. This choice is effected by engine selection block 54 on the basis of known parameters of the application and the synthesis engines; such parameters will typically include the subject domain, speaker (type, gender, age) required, etc.

Whilst the parameters of the speech application can be used to make an initial choice of synthesis engine, it is also useful to be able to change synthesis engine in response to low confidence scores. A change of synthesis engine can be triggered by the CAC 43 on a per utterance basis or on the basis of a running average score kept by the CAC 43. Of course, the block 54 will make its new selection taking account of the parameters of the speech application. The selection may also take account of the characteristics of the speaking voice of the previously-selected engine with a view to minimizing the change in speaking voice of the speech system. However, the user will almost certainly be able to discern any change in speaking voice and such change can be made to seem more natural by including dialog introducing the new voice as a new speaker who is providing assistance.

Since different synthesis engines are likely to require different sets of features for their feature vectors used for confidence scoring, each synthesis engine preferably has its own classifier 41, the classifier of the selected engine being used to feed the CAC 43. The threshold(s) held by the latter are preferably matched to the characteristics of the current classifier.

Each synthesis engine can be provided with its own language generator 23 or else a single common language generator can be used by all engines.

If the engine selection block 54 is aware that the user is multi-lingual, then the synthesis engine could be changed to one working in an alternative language of the user. Also, the modality of the output can be changed by choosing an appropriate non-speech synthesizer.

It is also possible to use confidence scores in the initial selection of a synthesis engine for a particular application. This can be done by extracting the main phrases of the application script and applying them to all available synthesis engines; the classifier 41 of each engine then produces an average confidence score across all utterances and these scores are then included as a parameter of the selection process (along with other selection parameters). Choosing the synthesis engine in this manner would generally make it not worthwhile to change the engine during the running of the speech application concerned.

Figure 8:
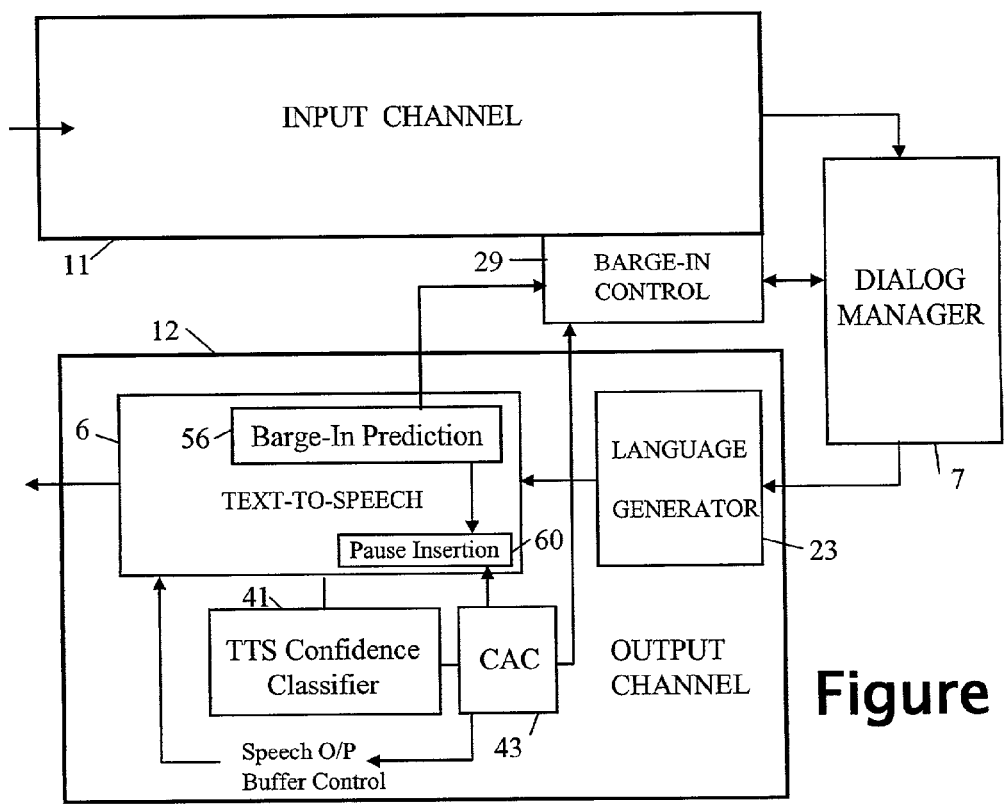
FIG. 8 is a diagram illustrating the use of the FIG. 4 confidence classifier to modify barge-in behaviour.

Barge-in predication (FIG. 8)—One consequence of poor synthesis, is that the user may barge-in and try and correct the pronunciation of a word or ask for clarification. A measure of confidence in the synthesis process could be used to control barge-in during synthesis. Thus, in the FIG. 8 embodiment the barge-in control 29 is arranged to permit barge-in at any time but only takes notice of barge-in during output by the speech system on the basis of a speech input being recognized in the input channel (this is done with a view to avoiding false barge-in detection as a result of noise, the penalty being a delay in barge-in detection). However, if the CAC 43 determines that the confidence score of the current utterance is low enough to indicate a strong possibility of a clarification-request barge-in, then the CAC 43 indicates as much to the barge-in control 29 which changes its barge-in detection regime to one where any detected noise above background level is treated as a barge-in even before speech has been recognized by the speech recognizer of the input channel.

In fact, barge-in prediction can also be carried out by looking at specific features of the synthesis process—in particular, intonation contours give a good indication as to the points in an utterance when a user is most likely to barge-in (this being, for example, at intonation drop-offs). Accordingly, the TTS 6 can advantageously be provided with a barge-in prediction block 56 for detecting potential barge-in points on the basis of intonation contours, the block 56 providing an indication of such points to the barge-in control 29 which responds in much the same way as to input received from the CAC 43.

Also, where the CAC 43 detects a sufficiently low confidence score, it can effectively invite barge-in by having a pause inserted at the end of the dubious utterance (either by a post-speech-generation pause-insertion function or, preferably, by re-synthesis of the text with an inserted pause—see pause-insertion block 60). The barge-in prediction block 56 can also be used to trigger pause insertion.

Train synthesis—Poor synthesis can often be attributed to insufficient training in one or more of the synthesis stages. A consistently poor confidence score could be monitored for by the CAC and used to indicate that more training is required.

Variants

It will be appreciated that many variants are possible to the above described embodiments of the invention. Thus, for example, the threshold level(s) used by the CAC 43 to determine when action is required, can be made adaptive to one or more factors such as complexity of the script or lexicon being used, user profile, perceived performance as judged by user confusion or requests for the speech system to repeat an output, noisiness of background environment, etc.

Where more than one type of action is available, for example, concept-rephrasing and supplementary-modality selection and synthesis engine selection, the CAC 43 can be set to choose between the actions (or, indeed, to choose combinations of actions), on the basis of the confidence score and/or on the value of particular features used for the feature vector 40, and/or on the number of retries already attempted. Thus, where the confidence score is only just below the threshold of acceptability, the CAC 43 may choose simply to use the supplementary-modality option whereas if the score is well below the acceptable threshold, the CAC may decide, first time around, to re-phrase the current concept; change synthesis engine if a low score is still obtained the second time around; and for the third time round use the current buffered output with the supplementary-modality option.

In the described arrangement, the classifier/CAC combination made serial judgements on each candidate output generated until an acceptable output was obtained. In an alternative arrangement, the synthesis subsystem produces, and stores in buffer 44, several candidate outputs for the same concept (or text) being interpreted. The classifier/CAC combination now serves to judge which candidate output has the best confidence score with this output then being released from the buffer 44 (the CAC may, of course, also determine that other action is additionally, or alternatively, required, such as supplementary modality output).

The language generator 23 can be included within the monitoring scope of the classifier by having appropriate generator parameters (for example, number of words in the generator output for the current concept) used as input features for the feature vector 40.

The CAC 43 can be arranged to work off confidence measures produced by means other than the classifier 41 fed with feature vector. In particular, where concatenative speech generation is used, the accumulative cost function can be used as the input to the CAC 43, high cost values indicating poor confidence potentially requiring action to be taken. Other confidence measures are also possible.

It will be appreciated that the functionality of the CAC can be distributed between other system components. Thus, where only one type of action is available for use in response to a low confidence score, then the thresholding effected to determine whether that action is to be implemented can be done either in the classifier 41 or in the element arranged to effect the action (e.g. for concept rephrasing, the language generator can be provided with the thresholding functionality, the confidence score being then supplied directly to the language generator).

The invention claimed is:

1. Speech apparatus comprising:
   a speech input channel including a speech recogniser;
   a speech output channel including a text-to-speech converter;
   a barge-in prediction arrangement arranged to assess an overall quality of speech-form passages being produced by the text-to-speech converter from input text-form utterances whereby to produce barge-in prediction indications in correspondence to speech-form passages assessed as inadequate; and
   a barge-in control for setting barge-in behaviour parameters for determining how the apparatus handles barge-in by a user during speech output by the apparatus, the barge-in control being arranged to be responsive to said barge-in prediction indications to adjust at least one said barge-in behaviour parameter for the corresponding speech-form passages assessed as inadequate,
   the barge-in control being arranged to be responsive to the said indications to adjust at least one said barge-in behaviour parameter for periods corresponding to the most likely barge-in points.

2. Apparatus according to claim 1, wherein the text-to-speech converter is arranged to generate, in the course of converting a text-form utterance into a speech-form passage, values of predetermined features that are indicative of the overall quality of the speech-form passage, the barge-in prediction arrangement comprising:
   a classifier arranged to be responsive to the feature values generated by the text-to-speech converter to provide a confidence measure of the speech-form passage concerned; and
   a comparator for comparing confidence measures produced by the classifier against one or more stored threshold values, in order to determine when a said barge-in prediction indication is to be produced.

3. Apparatus according to claim 1, wherein the text-to-speech converter includes a concatenative speech generator which, in generating a speech-form passsage, produces an accumulated unit selection cost in respect of the speech units used to make up the speech-form passage; the barge-in prediction arrangement comprising a comparator for comparing the selection cost produced by the speech generator against one or more stored threshold values, in order to determine when a said barge-in prediction indication is to be produced.

4. Apparatus according to claim 1, wherein the text-to-speech converter is arranged to be responsive to the generation of a said barge-in prediction indication to insert a pause in the corresponding speech-form passage.

5. Apparatus according to claim 1, wherein the barge-in control is arranged to respond to said barge-in prediction indication to set a said behaviour parameter such that any detected noise in the speech input channel is treated as barge-in during the corresponding speech-form passage, the barge-in control being arranged subsequently to reset this parameter such that noise in the speech input channel is only treated as a barge-in after it has been recognized as speech.

6. A method of controlling barge-in in speech apparatus that has both a speech input channel including a speech recogniser and a speech output channel including a text-to-speech converter; the method comprising the steps of:
   (a) automatically assessing overall quality of speech-form passages being produced by the text-to-speech converter from input text-form utterances whereby to produce barge-in prediction indications in correspondence to speech-form passages assessed as inadequate; and (b) adjusting, for periods corresponding to the speech-form passages assessed as inadequate, as indicated by said barge-in prediction indications, at least one barge-in behaviour parameter that determines how the apparatus handles barge-in by a user during speech output by the apparatus.

7. A method according to claim 6, wherein the text-to-speech converter generates, in the course of converting a text-form utterance into a speech-form passage, values of predetermined features that are indicative of the overall quality of the speech-form passage, step (a) including:

using a classifier responsive to the feature values generated by the text-to-speech converter to provide a confidence measure of the speech-form passage concerned; and comparing said confidence measures against one or more stored threshold values, in order to determine when a said barge-in prediction indication is to be produced.

8. A method according to claim 6, wherein the text-to-speech converter includes a concatenative speech generator which, in generating a speech-form passage, produces an accumulated unit selection cost in respect of the speech units used to make up the speech-form passage; step (a) including comparing the selection cost produced by the speech generator against one or more stored threshold values, in order to determine when a said barge-in prediction indication is to be produced.

9. A method according to claim 6, comprising the further step of inserting, in response to the generation of a said barge-in prediction indication, a pause in the corresponding speech-form passage.

10. A method according to claim 6, wherein in step (b) a said behaviour parameter is adjusted such that any detected noise in the speech input channel is treated as a barge-in during the corresponding speech-form passage, this parameter being subsequently re-adjusted such that noise in the speech input channel is only treated as barge-in after it has been recognized as speech.

* * * * *